US011987930B2

(12) United States Patent
Shimoni et al.

(10) Patent No.: US 11,987,930 B2
(45) Date of Patent: May 21, 2024

(54) METHOD FOR PRINTING ON COLORED SYNTHETIC FABRICS UTILIZING A DYE DISCHARGE MATERIAL

(71) Applicant: Kornit Digital Ltd., Rosh HaAyin (IL)

(72) Inventors: Allon Shimoni, Modiin-Maccabim-Reut (IL); Nir Funt, Ganei Tikva (IL); Katya Gloukhikh, Tel Aviv (IL)

(73) Assignee: Kornit Digital Ltd., Rosh HaAyin (IL)

( * ) Notice: Subject to any disclaimer, the term of this patent is extended or adjusted under 35 U.S.C. 154(b) by 112 days.

(21) Appl. No.: 17/780,032

(22) PCT Filed: Nov. 24, 2020

(86) PCT No.: PCT/IL2020/051208

§ 371 (c)(1),
(2) Date: May 26, 2022

(87) PCT Pub. No.: WO2021/105983

PCT Pub. Date: Jun. 3, 2021

(65) Prior Publication Data

US 2022/0403592 A1 Dec. 22, 2022

Related U.S. Application Data

(60) Provisional application No. 62/940,297, filed on Nov. 26, 2019.

(51) Int. Cl.

| | |
|---|---|
| ***D06P 5/00*** | (2006.01) |
| ***B41M 1/24*** | (2006.01) |
| ***B41M 3/00*** | (2006.01) |
| ***B41M 7/00*** | (2006.01) |
| ***D06P 5/15*** | (2006.01) |
| ***D06P 5/30*** | (2006.01) |

(52) U.S. Cl.

CPC ................. *D06P 5/15* (2013.01); *B41M 1/24* (2013.01); *B41M 3/008* (2013.01); *B41M 7/009* (2013.01); *D06P 5/30* (2013.01)

(58) Field of Classification Search

CPC .. D06P 5/15; D06P 5/30; D06P 5/151; B41M 1/24; B41M 3/008; B41M 7/009; B41M 1/30; B41M 5/0064

USPC .............................................................. 8/445

See application file for complete search history.

(56) References Cited

U.S. PATENT DOCUMENTS

| | | | | |
|---|---|---|---|---|
| 3,781,169 | A | 12/1973 | Deubel et al. | |
| 4,400,174 | A | 8/1983 | Blum et al. | |
| 4,516,979 | A | 5/1985 | Baumann | |
| 4,622,070 | A | 11/1986 | Sakurai et al. | |
| 5,781,216 | A | 7/1998 | Haruta | |
| 5,846,266 | A | 12/1998 | Rattee | |
| 6,451,070 | B1 | 9/2002 | Kent et al. | |
| 7,134,749 | B2 | 11/2006 | Ben-Zur et al. | |
| 7,607,745 | B2 | 10/2009 | Ben-Zur | |
| 7,954,921 | B2 | 6/2011 | Ben-Zur et al. | |
| 8,092,003 | B2 | 1/2012 | Sloan | |
| 8,292,395 | B2 | 10/2012 | Ben-Zur et al. | |
| 8,540,358 | B2 | 9/2013 | Mozel et al. | |
| 8,801,127 | B2 | 8/2014 | Ben-Zur | |
| 8,926,080 | B2 | 1/2015 | Mozel et al. | |
| 9,453,301 | B2 | 9/2016 | Sloan | |
| 9,598,815 | B2 * | 3/2017 | Okada | D06P 5/155 |
| 9,611,401 | B2 | 4/2017 | Mozel et al. | |
| 9,616,683 | B2 | 4/2017 | Mozel et al. | |
| 9,624,390 | B2 | 4/2017 | Mann et al. | |
| 9,725,848 | B2 * | 8/2017 | Mozel | D06P 5/15 |
| 9,790,047 | B2 | 10/2017 | Snir | |
| 9,988,761 | B2 | 6/2018 | Sloan | |
| 10,131,143 | B2 | 11/2018 | Snir | |
| 10,150,305 | B2 | 12/2018 | Mozel | |
| 10,246,821 | B2 | 4/2019 | Sloan | |
| 10,391,784 | B2 | 8/2019 | Ben-Zur et al. | |
| 10,407,267 | B2 | 9/2019 | Snir | |
| 2002/0138920 | A1 * | 10/2002 | Pepitone | D06P 1/44 8/445 |
| 2004/0171765 | A1 | 9/2004 | Tsuji et al. | |
| 2004/0252173 | A1 | 12/2004 | Ben-Zur et al. | |
| 2006/0111510 | A1 | 5/2006 | Tanaka et al. | |
| 2007/0050914 | A1 * | 3/2007 | Kitagawa | D06P 5/153 8/115.51 |
| 2015/0252520 | A1 | 9/2015 | Okada et al. | |

(Continued)

FOREIGN PATENT DOCUMENTS

| | | |
|---|---|---|
| JP | 62-206092 | 9/1987 |
| JP | 2008-81901 | 4/2008 |

(Continued)

OTHER PUBLICATIONS

International Preliminary Report on Patentability dated Jun. 9, 2022 From the International Bureau of WIPO Re. Application No. PCT/IL2020/051208. (7 Pages).

International Search Report and the Written Opinion dated Mar. 7, 2021 From the International Searching Authority Re. Application No. PCT/IL2020/051208. (12 Pages).

Singh et al. "Inkjet Printing—Process and Its Applications", Advanced Materials, 22(6): 673-685, Feb. 9, 2010.

Tawiah et al. "The Chemistry of Inkjet Inks for Digital Textile Printing—Review", Best: International Journal of Management, Information Technology and Engineering, 4(5): 61-78, May 2016.

Notification of Office Action and Search Report dated Sep. 19, 2023 From the State Intellectual Property Office of the People's Republic of China Re. Application No. 202080092032.2. (9 Pages).

(Continued)

*Primary Examiner* — Eisa B Elhilo

(57) ABSTRACT

Provided herein is a method for forming an image on a dyed synthetic fabric, using a dye-discharge agent, the method is effected by printing an ink composition on the fabric and applying a dye-discharge agent essentially on the same area of the ink composition, wherein applying the dye-discharge agent is effected while the ink composition is still wet (uncured), prior to a curing of the image, and followed by curing the fully formed image, whereas the dye-discharge agent discharged the dye that migrated during the curing step, but not the dyed fabric.

6 Claims, No Drawings

(56) References Cited

U.S. PATENT DOCUMENTS

| | | | |
|---|---|---|---|
| 2015/0284905 | A1 | 10/2015 | Mozel |
| 2015/0353745 | A1 | 12/2015 | Motupalli et al. |
| 2016/0194509 | A1 | 7/2016 | Mozel |
| 2017/0298571 | A1 | 10/2017 | Mozel |
| 2018/0320311 | A1 | 11/2018 | Mozel |

FOREIGN PATENT DOCUMENTS

| | | |
|---|---|---|
| JP | 5037081 | 9/2012 |
| JP | 2018-009266 | 1/2018 |
| WO | WO 2005/076730 | 8/2005 |
| WO | WO 2005/115089 | 12/2005 |
| WO | WO 2005/115761 | 12/2005 |
| WO | WO 2006/120668 | 11/2006 |
| WO | WO 2011/018786 | 2/2011 |
| WO | WO 2014/076705 | 5/2014 |
| WO | WO 2015/025310 | 2/2015 |
| WO | WO 2016/013016 | 1/2016 |
| WO | WO 2016/016884 | 2/2016 |
| WO | WO 2017/021960 | 2/2017 |
| WO | WO 2017/060902 | 4/2017 |
| WO | WO 2017/081680 | 5/2017 |
| WO | WO 2017/081682 | 5/2017 |
| WO | WO 2017/109785 | 6/2017 |
| WO | WO 2017/109786 | 6/2017 |
| WO | WO 2018/025268 | 2/2018 |
| WO | WO 2018/078634 | 5/2018 |
| WO | WO 2018/122854 | 7/2018 |
| WO | WO 2018/138720 | 8/2018 |
| WO | WO 2019/049135 | 3/2019 |
| WO | WO 2019/077603 | 4/2019 |
| WO | WO 2019/077612 | 4/2019 |
| WO | WO 2019/077615 | 4/2019 |
| WO | WO 2019/092712 | 5/2019 |
| WO | WO 2019/092727 | 5/2019 |
| WO | WO 2021/105983 | 6/2021 |

OTHER PUBLICATIONS

English Summary dated Oct. 4, 2023 of Notification of Office Action dated Sep. 19, 2023 From the State Intellectual Property Office of the People's Republic of China Re. Application No. 202080092032.2. (2 pages).

Supplementary European Search Report and the European Search Opinion dated Nov. 28, 2023 From the European Patent Office Re. Application No. 20893684.9. (9 Pages).

* cited by examiner

METHOD FOR PRINTING ON COLORED SYNTHETIC FABRICS UTILIZING A DYE DISCHARGE MATERIAL

RELATED APPLICATIONS

This application is a National Phase of PCT Patent Application No. PCT/IL2020/051208, having International filing date of Nov. 24, 2020, which claims the benefit of priority under 35 USC § 119(e) of U.S. Provisional Patent Application No. 62/940,297 filed on Nov. 26, 2019. The contents of the above applications are all incorporated by reference as if fully set forth herein in their entirety.

FIELD AND BACKGROUND OF THE INVENTION

The present invention, in some embodiments thereof, relates to fabric printing and more particularly, but not exclusively, to a method of printing images on colored synthetic fabrics.

Synthetic fabrics, made of polymeric filaments, such as cellulose acetate, nylon, polyester, acrylic, and the likes, are typically dyed using dispersed dyes that infiltrate the fabric's threads when heat is applied. Heat loosens the thread's filaments and the dispersed dye molecules become trapped in the threads when the temperature is reduced.

In general, images and patterns are printed on fabrics using inks that contain colorants, such as pigments and dyes, and in case of pigment-based colorants, further include film-forming agents, binders and adhesion promoting agents that keep the printed images attached to the fabric during use and washes. These inks are set on the fabric substrate in a step referred to as curing, which typically involves heating the printed substrate.

As can be reckoned, printing on a dyed synthetic fabric using an ink that requires curing may lead to undesired results, stemming from migration of dye from the fabric to the printed image/pattern during the curing step, and staining the image/pattern, thereby distorting the intended printed colors.

U.S. Pat. No. 7,134,749 provides a method and an apparatus for color printing on a dark textile piece, the method includes the steps of digitally applying a white ink layer directly onto a textile piece, and digitally printing a colored image on said white ink layer before curing the white ink. The limitation of this technology, is its adequacy to synthetic fabrics dyed with dispersed dyes, wherein the dye migrates to the white underbase layer, and tints it at the image curing step.

U.S. Pat. No. 9,624,390 teaches a method of inkjet printing an image on a dyed synthetic textile substrate, which includes modifying a synthetic textile so as to exhibit negatively charged functional groups thereon so as to obtain a modified synthetic textile substrate; dying the modified synthetic textile substrate so as to obtain a dyed modified synthetic textile substrate; contacting at least a portion of a surface of the modified substrate with an immobilization composition which comprises an acid, to thereby obtain a wet portion of the modified substrate; inkjet printing a colored ink composition and/or an opaque white underbase ink composition directly on the wet portion, to thereby form the image; and curing the image. The limitation of this technology is the requirement to pre-treat the fabric, which adds to the processing time and cost, and may not be suitable for all synthetic fibers.

WIPO Patent Application WO/2018/138720 discloses an inkset designed for printing on dyed synthetic fabrics, which includes an immobilizing composition and at least one ink composition, the ink composition comprises a dispersed pigment and/or dye, a low-temperature curing self-cross-linking resin and an aqueous carrier, and formulated to exhibit an alkaline pH higher than 7, the immobilizing composition comprises an acid and an aqueous carrier, and formulated to exhibit an acidic pH lower than 7, the inkset is for digital inkjet printing color images directly on a dyed substrate, wherein the low-temperature curing self-cross-linking resin is a pH-sensitive low-temperature curing self-crosslinking resin that initiates the crosslinking reaction at a temperature that is lower than the typical curing temperature and ranges from 90° C. to 110° C. The limitation posed by this technology is the cost of such low-temperature curing self-crosslinking resin, and its adequacy for all synthetic fabrics even in low temperature curing of 100-110° C. may suffer from dye migration due to the quality or other properties of the fabric dyeing process, ink compositions and customer's demands.

SUMMARY OF THE INVENTION

The present invention provides a method for printing on pre-dyed synthetic fabrics, using a dye-discharge agent to overcome staining of the printed image by the dye of the fabric, which is capable of migrating from the fabric to the film formed by the ink composition, particularly upon curing the film which is effected by heating. The method is general for all printing techniques that require curing the printed image or pattern by heat—heat at the level that may release dye from the pre-dyed fabric. In essence, the methods is based on applying a dye-discharge agent during the printing process before the curing step (a "wet-on-wet" printing process), whereas the application of the dye-discharge agent is effected before, during or after the printing step, or can be mixed in the ink of the underbase layer, such that when the printed fabric is heated to effect curing, the dye that migrated from the fabric is discharged by the dye-discharge agent, without affecting the color of the substrate by the dye-discharge agent.

Thus, according to an aspect of some embodiments of the present invention there is provided a method of printing an image on a dyed synthetic fabric, that includes:

(a) applying at least one ink composition on the fabric on at least one first area, so as to form the image;

(b) applying a dye-discharge agent on at least one second area of the fabric, the second area is at least partially overlapping the first area; and (c) heating the at least one ink composition;

wherein:

the dyed synthetic fabric releases a dye upon the heating, and the dye is dischargeable by the dye-discharge agent when released from the fabric.

According to some embodiments of the present invention, step (a) is effected prior to, concomitant with and/or subsequent to step (b), while the ink composition is uncured.

According to some embodiments of the present invention, step (c) is effected subsequent to steps (a) and (b).

According to some embodiments of the present invention, the heating is effected at a curing temperature of the ink composition.

According to some embodiments of the present invention, step (a) is effected prior to step (b).

According to some embodiments of the present invention, step (a) is effected concomitant with step (b).

According to some embodiments of the present invention, step (a) is effected subsequent to step (b).

According to some embodiments of the present invention, the pigment in the ink composition is impervious to the dye-discharge agent.

According to some embodiments of the present invention, at least one ink composition includes an opaque white pigment, and applying the ink composition further that includes applying another ink composition that that includes a transparent colored pigment subsequent to the white ink composition.

According to some embodiments of the present invention, applying the ink composition and/or the dye-discharge agent is effected by inkjet printing, screen printing or spray.

According to some embodiments of the present invention, method provided herein further includes curing the image after applying the ink composition and the dye-discharge agent.

According to another aspect of some embodiments of the present invention, there is provided a method of improving the whiteness of a white layer printed on a dyed substrate, that includes applying a white ink composition on at least one an area of the substrate and applying a dye-discharge agent essentially on the area, wherein the dyed substrate releases a dye upon heating the substrate, the dye is dischargeable by the dye-discharge agent when released from the substrate, and the applying the dye-discharge agent is effected prior to the heating of the ink composition.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

DESCRIPTION OF SOME SPECIFIC EMBODIMENTS OF THE INVENTION

The present invention, in some embodiments thereof, relates to fabric printing and more particularly, but not exclusively, to a method of printing images on colored synthetic fabrics.

Before explaining at least one embodiment of the invention in detail, it is to be understood that the invention is not necessarily limited in its application to the details set forth in the following description or exemplified by the Examples. The invention is capable of other embodiments or of being practiced or carried out in various ways.

A long-felt need of the fabric printing industry is a method for printing colorful images and patterns on synthetic fabrics, with high color definition and acceptable wash-fastness. The problem associated with colored synthetic fabrics and image printing is the combination of dye migration from the substrate to the printed image, which occurs when the ink used to form the image undergoes curing at a relatively high temperature (above about 140° C., or in some cased above about 100-110° C.). While heat is required to cure the ink, it is also associated with increased dye migration.

Thus, while conceiving the present invention, the inventors have noticed that when applying dye-discharge agents on a dyed synthetic fabric, the color of the fabric is hardly affected, presumably due to the mechanical protection of the fabric's filaments surrounding the dye substance; however, when the fabric is heated to curing temperatures, and some of the dye in the dyed substrate begins to migrate out of the fabric's filaments, it becomes susceptible to the same dye-discharge agents that did not affect it while it was in the fabric. In view of this phenomenon, the present inventors have contemplated applying a dye-discharge agent on the dyed substrate during a printing process, assuming this dye-discharge agent will discharge (render colorless) only the dye substance that was released from the fabric at the curing step, leaving the substrate unaffected color-wise, and protecting the intended colors of the image from staining by the migrating dye.

A Method for Printing on Dyed Fabrics:

Thus, according to some aspects of the present disclosure, there is provided a method of printing an image or a pattern on a pre-dyed synthetic fabric, which is effected by applying a dye-discharge agent on the fabric during the printing of the image and prior to drying and/or heating or otherwise curing the inks, wherein the dye-discharge agent is applied to the fabric substantially on the same area of the image, or exceeding/extending the printed area, or treating the entire substrate therewith. The method further includes, subsequent to printing the image and applying the dye-discharge agent, heating the ink (image) on the substrate, or heating the part of the substrate having the image/ink thereon, or heating parts of the substrate that include the image/ink thereon, or heating the entire substrate having the image/ink thereon.

In some embodiments, heating the image, or the substrate having the image thereon, or the entire substrate, is effected at a temperature that caused the ink forming the image to cure (heating to a curing temperature). In the context of embodiments of the present invention, curing is effected at a temperature of at least 100° C., at least 110° C., at least 120° C., at least 130° C., or at least 140° C., which can be higher than the temperature at which the dye in the substrate is able to migrate from the dyed substrate. Heating may be carried out by IR radiation, hot-air, heating coils, laser, and any non-contact form of heating which is suitable for the inkjet or screen printing environment and machinery. In the context of some embodiments of the present invention, the heating is effected in order to cure the ink and affix it to the substrate.

In some aspects of the invention disclosed herein, the substrate or any of the compositions applied or printed thereon, are not heated, dried or cured before the image is fully formed on the substrate. This printing method is referred to as a method of printing a wet composition over another wet composition, or in short, "wet-on-wet".

The area on which the ink composition and the dye-discharge agent is applied to may be similar or different, as long as there is at least some overlap between the two areas. In the context of the instant disclosure, the ink composition is said to cover a first area and the dye-discharge anent is said to cover a second area. In some embodiments, the ink composition and the dye-discharge agent are applied on essentially the same area, since the dye-discharge agent in needed to protect the entire image from staining by the migrating dye. In some embodiments, the dye-discharge agent is applied on an area that exceeds the area of the image, namely dye-discharged area is smaller than the area of the image, forming dye-discharged margins around the image (for example, margins of 0.5-10 mm). In some embodiments, the dye-discharge agent is applied on an area that is smaller than the area of the image.

In some aspects of the invention disclosed herein, the dye-discharge agent is applied on the dyed substrate prior to, during (concomitantly) or subsequent to the printing of a white underbase ink layer, which is allowed to dry or cure thereafter, and subsequently the image is fully formed on the substrate using colored ink compositions, and cured thereafter. In some aspects of the invention disclosed herein, the dye-discharge agent is applied on the dyed substrate prior to, during or subsequent to the printing of any type of ink on the substrate, including white underbase ink layer as well as any colored ink composition.

The application of the dye-discharge agent is said to be effected as an integral (in-line) part of the printing process, namely application of the dye-discharge agent is may effected before, concomitantly or after any ink is printed on the substrate, whereas the application of the dye-discharge agent is effected while the ink is still wet (before drying or curing in a "wet-on-wet" process), and the printing of the ink is effected while the composition used to deliver the dye-discharge agent is still wet. In the context of aspects of the present disclosure, the dye-discharge agent is applied on the dyed substrate in-line of the printing process rather than before the printing process as a standalone layer, which is regarded as pre-treatment of the substrate in the context of the present disclosure. In some aspect of the present disclosure, the ink is a white underbase ink, which is allowed to cure with the dye-discharge agent prior to printing other colored inks thereon.

The printing of the image may be effected by inkjet printing methodologies, by screen printing methodologies, including transfer printing methodologies, as these methodologies are known in the art.

The application of the dye-discharge composition may also be effected by inkjet printing methodologies, by spray methodologies, by screen printing methodologies, including transfer printing methodologies.

When using inkjet printing methodologies, the user may use any of the processes and methods disclosed in, for example, in Benjamin Tawiah, Ebenezer K. Howard and Benjamin K. Asinyo, "*The Chemistry Of Inkjet Inks For Digital Textile Printing—Review", BEST: International Journal of Management, Information Technology and Engineering* (*BEST: IJMITE*), ISSN (P): 2348-0513, ISSN (E): 2454-471X, 4(5), May 2016, pp. 61-78; and Madhusudan Singh, Hanna M. Haverinen, Parul Dhagat, and Ghassan E. Jabbour, "*Inkjet Printing—Process and Its Applications*" *Adv. Mater.*, 2010, 22, pp. 673-685, the content of each is incorporated herein in its entirety.

According to some embodiments, the method disclosed herein does not involve dye blocking, meaning the method provided herein does not make use of a resin that is selected to mechanically block the passage of migrating dye from the fabric substrate to the printed image.

According to some embodiments, the method disclosed herein does not involve any step of mid-process drying or mid-process flash drying or mid-process partial curing, or mid-process heating of the substrate to an elevated temperature (e.g., above 50, 60, 70, 80 or above 90° C.) with or without some layers applied thereon, meaning that in the method provided herein the printing process essentially includes one final curing step, in which the substrate having the dye-discharge agent and any number of ink layers comprising the image, are cured simultaneously in one step at the end of the printing process. Hence, the method provided herein is a "wet-on-wet" process, wherein all the liquid compositions are applied on the surface of the substrate in any order, while the substrate is still "wet" from the first liquid composition (immobilizing, dye-discharge or ink composition) applied thereon.

A Dyed Synthetic Fabric:

According to some aspects of the present disclosure, the method is particularly effective for printing on dyed synthetic fabrics. The term "synthetic", as used herein, refers to the source of the filaments, threads and yarns that are used to form a fabric, which is used as a substrate in a printing process. In the context of aspects of the present disclosure, a synthetic fabric is one that includes fibers made of polyester, nylon, acetate, triacetate, vinylon, acryl, and any combination thereof with other synthetic fibers as well as with natural fibers (such as silk, wool, cotton and cellulose/rayon).

According to some aspects of the present disclosure, the fabric substrate is pre-dyed prior to the printing process provided herein, but otherwise is untreated for receiving an ink composition or a dye-discharge agent thereon. In the context of some aspects of the present disclosure, the pre-dyed substrate is not chemically or physically treated prior to its use as a substrate in such way that the dye therein is arrested or inhibited from heat-induced migration. In other words, the dye used to dye the pre-dyed substrate that can be used in the process provided, can migrate (is migratable) under typical print-curing conditions. It is assumed that a pre-treated pre-dyed fabric is more expensive, and may also be less suitable for image/pattern printing using screen or inkjet printing methodologies. According to some aspects of the present disclosure, the fabric substrate is pretreated by the manufacturer to exhibit minimal dye migration; it was found by the present invention that even fabrics that had been pretreated for that purpose still stained the images printed thereon.

As used herein, the phrases "dyed synthetic fabric", "dark synthetic fabric", or "dyed synthetic substrate", and the likes, which is also referred to herein interchangeably as a "dyed surface", a "colored substrate", a "colored surface", and a "darkly-colored surface", are used interchangeably throughout this disclosure. Both of the term "dyed synthetic fabric" or "pre-dyed synthetic fabric", refer to a substrate, or a surface of a substrate, that has been pre-dyed (prior to the image/pattern printing process) to have any color other than white. A pre-dyed substrate, according to the present invention, is having any color other than white is a color that is essentially not white (non-white), such as for example, a yellow substrate, a gray substrate, a red substrate, a black substrate and the likes. According to some embodiments of the present invention, the lightness of a darkly-colored substrate or of its surface has a color which is attributed an L* (lightness) value of 80, or about 50, or less and any a* and b* values on the L*a*b* scale.

As used herein, the term "L*a*b*" or "Lab*" refers to the CIE L*a*b* (International Commission on Illumination or Commission Internationale d'Eclairage, CIE) color model. Used interchangeably herein and throughout, CIE L*a*b*, L*a*b* or Lab is the most complete color model used conventionally to describe all the colors and shades which are typically visible to a normal human eye. The three parameters in the model define a particular color, whereas the lightness of the color is represented by the parameter L*, wherein L*=0 corresponds to theoretic (perfect) black and L*=100 corresponds to theoretic white. The value between true magenta and true green is represented by the parameter a*, wherein a negative value indicates green and a positive value indicates magenta. The value between true yellow and true blue is represented by the parameter b*, wherein a negative value indicates blue and a positive value indicates yellow.

According to some aspects of the present disclosure, the lightness of a lightly-colored substrate or of its surface has a color which is attributed an L* (lightness) value of more than about 50 and any a* and b* values on the L*a*b* scale, as discussed hereinabove and further detailed hereinbelow. Accordingly, the lightness of a darkly-colored substrate or of its surface has a color which is attributed an L* (lightness) value of less than about 50 and any a* and b* values on the L*a*b* scale.

The L*a*b* scale is also used to assess the migration of a substrate dye into the printed image, as well as the effect of the dye-discharge agent on the same. One exemplary way to assess the effect of the dye-discharge agent is to measure L*a*b* values to a white image before it has been cured (or partly dried at 100° C. or less to make the measurement easier on dry substrate) on a darkly-colored substrate, and repeat the measurement for a fully cured image, with and without the use of a dye-discharge agent—it is expected that the image cured with a dye-discharge agent will exhibit L*a*b* values that are closer to those measured for the pre-cured image, compared to the L*a*b* values measured for the cured image without dye-discharge agent.

The Example section that follows bellow presents some experimental proof of concept, according to aspect of the present disclosure.

The term "dye", as used herein, refers to a substance that is used to alter the color of a fabric, and preferably a synthetic fabric. Some of the most commonly used dyes for synthetic fabrics belong to the family of dispersed dyes. This family of dyes include substances that interact with the filaments of the fabric via van der Waals forces, and the process by which the fabrics are dyes using dispersed dyes is by soaking the fabric in an aqueous solution containing the dispersed dye or deposit the dispersion with the dispersed dyes on the fabric, and heating the solution such that accessible space between the filaments of the fabric is occupied with disperse dye particles, which become trapped therein upon cooling the fabric. Alternatively, the pre-dyed substrate used in the method provided herein is dyed using dye sublimation methodologies and/or dyes, namely dye that can interact with the substrate in the gaseous phase. (there is an option to use sublimation dyes for dyeing in the same way of dispersed dyes) As such, it is to be understood that heat, which is responsible for the infiltration of the dye into the fabric, may also reverse this phenomenon, causing dye particles and molecules to migrate from a dyes substrate upon heating the substrate, for example, during a curing step.

Thus, according to some aspects of the present disclosure, the dye in the dyed substrate, belongs to any one of the families of dyes that can be used to dye a synthetic fabric, and include, without limitation, dispersed dyes, cationic dyes, acid dyes, and metal chelated acid dyes. According to preferred embodiments of the present invention, the dye in the dyed substrate is a dispersed dye, such as, without limitation, Azo disperse dyes, Anthraquinone disperse dyes, Nitroarylamino disperse dyes, Coumarin disperse dyes, Methine disperse dyes, Naphthostyryl disperse dyes, Quinophthalone disperse dyes, Formazan disperse dyes, and Benzodifuranone disperse dyes.

According to some aspects of the present disclosure, the dye in the dyed substrate is a dispersed dye. Disperse dyes were first developed to dye acetate fibers, which are hydrophobic fibers that have little affinity for water-soluble dyes. A method to dye hydrophobic fibers was developed by dispersing colored organic substances in water using a surfactant. Thus, finely colored particles are applied in aqueous dispersion and the color infiltrates into the hydrophobic fiber. Disperse dyes are the most widely used dyes for dyeing acetate, polyester, acrylic, aramid, modacrylic, nylon, and olefin fibers, with good to excellent colorfastness.

In contrast to most families of dyes, which are susceptible to dye-discharge agents, pigment colorant are relatively resistant to the bleaching effect of the same dye-discharge agents that bleach-out dispersed dyes. Pigment colorants are not dyes but insoluble coloring particles, and are typically printed on fabric using resin binders. The adhesive attaches the color to the fabric, and the color- and washfastness depends on the binder or adhesive used rather than the pigment. Pigment printing is an economical and simple means of adding color to fabrics, and are particularly useful in inkjet printing and screen printing. According to some aspects of the present disclosure, the image in printed on the dyed substrate using pigment colorants.

A Dye-Discharge Agent:

The term "dye-discharge agent", as used herein, refers to a substance that can cause a dye to lose it color. Alternatively, a "dye-discharge agent" may be referred to as a bleaching or whitening agent, or a "dye-bleaching agent", however, the term "bleach" is more commonly used for certain types of oxidizing substances, some of which may be used in the context of some aspects of the present disclosure. Hence, the term "dye-discharge agent" is used herein to encompass all types of substances that can cause a dye in a dyed substrate to become substantially colorless, reducing agents and oxidizing agents alike.

Exemplary reducing agents that can be used as a dye-discharge agent in the context of some aspects of the present disclosure include, without limitation, sulfur-based reducing agents, such as dithionites ($S_2O_4^{2-}$), sulfites ($SO_3^{2-}$) and bisulfites ($HSO^{3-}$), and hydrides, such as sodium borohydride ($NaBH_4$).

The term "sulfur-based reducing agent", as used herein, is meant to encompass substances that contain a sulfur-containing moiety. In some of any of the embodiments described herein, the sulfur-containing moiety is a hyposulfite moiety, which is a form of sulfur oxyanion. The term "hyposulfite moiety", according to embodiment of the present invention, is meant to encompass moieties which include a $[R—SO_2]^-$ group, wherein R may be an $SO_2^-$ group, an —SH group, a $—CH_2—SH$ group, a $—S^-$ group, a $—CH_2—S^-$ group, an —OH group, a $—CH_2—OH$ group, a $—O^-$ group, a $—CH_2—O^-$ group, as well as to encompass moieties which include a $[R—SO_3]^-$ group, with R being as defined hereinabove.

Exemplary sulfur-based reducing agents include, without limitation, zinc formaldehyde sulfoxylate ($Zn(HOCH_2SO_2)_2$, also known as Decroline, Decolin, Safolin and ZFS), sodium hydroxymethylsulfinate ($NaHOCH_2SO_2$, also known as Rongalite, Bruggolite, sodium formaldehyde sulfoxylate, sodium oxymethylene sulfoxylate), sodium dithionite, sodium pyrosulfite (sodium metabisulfite, $Na_2S_2O_5$), sodium bisulfite ($NaHSO_3$), sodium sulfite ($Na_2SO_3$) and sodium thiosulfate ($Na_2S_2O_3$), thiourea dioxide (formamidinesulfinic acid), and any combination thereof. Sulfur-based reducing agents may also include, according to some embodiments of the present invention, sodium sulfide ($Na_2S·9H_2O$) and thionyl chloride ($SOCl_2$), which do not contain a hyposulfite moiety, but contain sulfur and exert a reducing effect. According to some aspects of the present disclosure, the sulfur-based reducing agent is zinc formaldehyde sulfoxylate (ZFS or Decrolin). Other reducing agents suitable for acting as a dye-discharge agents, include sodium bisulfite, sodium borohydride, sodium dithionite, sodium sulfite, sulfur dioxide and combinations thereof.

Exemplary oxidizing agents that can be used as a dye-discharge agent in the context of some aspects of the present disclosure include, without limitation, acetic acid, sodium hypochlrite, calcium hypochlorite, chlorine, chlorine dioxide, hydrogen peroxide, potassium dichromate, sodium bisulfite, sodium borohydride, sodium dichloroisocyanurate, sodium dithionite, sodium hypochlorite, sodium perborate, sodium percarbonate, sodium peroxide, sodium sulfite, sulfur dioxide, and combinations thereof.

In general, the dye-discharge agent can be delivered to the substrate as part of an ink composition, or in the form of a standalone liquid composition, or as a paste, depending on the technique of printing or application preferred by the user. Exemplary dye-discharge compositions that may be used in the context of the present disclosure include those disclosed in U.S. Pat. No. 9,725,848, and U.S. Patent Application Publication Nos. 2016/0194509 and 2018/0320311, the content of each is incorporated herein in its entirety.

According to preferred embodiments of the present invention, the dye-discharge agent is ZFS, however, other dye-discharge agents are contemplated within the scope of the instant disclosure.

It is noted herein that in the context of the present disclosure, the dye-discharge agent does not affect a pigment-based colorant, which is to say that the pigment in the ink composition is substantially impervious to the dye-discharge composition.

According to preferred embodiments of the present invention, the dye-discharge agent is applied to the substrate by means of a spreadable paste, a nozzle or an inkjet printhead, and is therefore formulated into a composition, referred to herein as a dye-discharge composition. An exemplary, non-limiting dye-discharge composition may have the following formulation:

| | |
|---|---|
| humectants (PG, BG, glycerin) | 10%-40% |
| Chelating agents | 5-25% |
| Zinc formaldehyde Sulfoxylate) | 5-20% |
| water | complete to 100% |

and may further be characterized by the following mechanical properties:

| | |
|---|---|
| Surface Tension | 20-30 millinewtons per meter |
| Viscosity Rheometer (@4000 $sec^{-1}$) | 8-20 cPs @ 35° C. |

When formulated for screen printing, the dye-discharge composition is characterized by having the formulation as described, for example, in U.S. Pat. No. 2,874,022. It is noted that for some screen printing methodologies, each ink application requires some partial drying to be effected, at least to some extent, before another ink composition may be applied thereon, while these partial drying steps does not cure the inks.

It is expected that during the life of a patent maturing from this application many relevant for using a dye-discharge agent for printing on dyed synthetic fabrics will be developed and the scope thereof is intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the phrases "substantially devoid of" and/or "essentially devoid of" in the context of a certain substance, refer to a composition that is totally devoid of this substance or includes less than about 5, 1, 0.5 or 0.1 percent of the substance by total weight or volume of the composition. Alternatively, the phrases "substantially devoid of" and/or "essentially devoid of" in the context of a process, a method, a property or a characteristic, refer to a process, a composition, a structure or an article that is totally devoid of a certain process/method step, or a certain property or a certain characteristic, or a process/method wherein the certain process/method step is effected at less than about 5, 1, 0.5 or 0.1 percent compared to a given standard process/method, or property or a characteristic characterized by less than about 5, 1, 0.5 or 0.1 percent of the property or characteristic, compared to a given standard.

When applied to an original property, or a desired property, or an afforded property of an object or a composition, the term "substantially maintaining", as used herein, means that the property has not change by more than 20%, 10% or more than 5% in the processed object or composition.

The term "exemplary" is used herein to mean "serving as an example, instance or illustration". Any embodiment described as "exemplary" is not necessarily to be construed as preferred or advantageous over other embodiments and/or to exclude the incorporation of features from other embodiments.

The words "optionally" or "alternatively" are used herein to mean "is provided in some embodiments and not provided in other embodiments". Any particular embodiment of the invention may include a plurality of "optional" features unless such features conflict.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the terms “process” and “method” refer to manners, means, techniques and procedures for accomplishing a given task including, but not limited to, those manners, means, techniques and procedures either known to, or readily developed from known manners, means, techniques and procedures by practitioners of the chemical, material, mechanical, computational and digital arts.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental and/or calculated support in the following examples.

EXAMPLES

Reference is now made to the following examples, which together with the above descriptions illustrate some embodiments of the invention in a non-limiting fashion.

Example 1

A proof of concept of some aspects of the present disclosure was carried out by inkjet printing a white underbase ink composition on a “Promodoro 3560” polyester red shirt, using a Kornit™ inkjet printing system. While the white ink layer was still wet (before curing; “wet-on-wet”) a 4 wt % sodium hypochlorite aqueous formulation, used as an exemplary dye-discharge agent composition was poured over the printed area of the dyed-substrate, and thereafter the shirt was cured in a hot air drier for 6 minutes at 140° C.

Table 1 presents the L*a*b* measurements of the white layer with and without the discharge agent above the uncured white layer.

TABLE 1

| | Average L* | Average a* | Average b* |
|---|---|---|---|
| Without dye-discharge agent | 87.575 | 17.2 | −0.9 |
| With drops of a dye-discharge agent formulation | 89.6 | 11.8 | 0.8 |

The results presented in Table 1 indicate a delta E value of 6, a delta L* of 2, and a delta a* of 5.4. As can be reckoned from these results, the application of the dye-discharge agent on the wet white ink layer improves the lightness of the cured white ink by 2 units and reduced the red tint by 5 units (the b* value was not expected to vary by much, as observed in practice).

Example 2

A more elaborate experiment for testing the paradigm of the present disclosure was carried out by using an ink composition that is formulated to cure at a relatively low temperature of only 110 C, and comprising an opaque white pigment. The objective of this experiment was to determine if a lower curing temperature can solve the problem of dye migration without a dye-discharge agent.

Printing machine was an Avalanche (by Kornit).

Red-dyed substrate was a Promodoro 3560 red polyester t-shirt.

The curing was set to 12 minutes at 110° C.

In order to set a base line—

Color augmentation was measured using a color analyzer, outputting the Lab values based on a pure white standard and a standard 6500° K color temperature light source.

First, a white pattern was printed on an untreated substrate without a dye-discharge agent, and exposed to 80° C. At this temperature the red dye was not observed in the white pattern (measured a*=−0.1), however, the pattern was also not cured and could not pass a fastness test—the results was 1—the printed film totally get off the shirt, the standard used was—AATCC61. while after curing the ink at 110° C. the wash fastness was 4—the higher the better.

Secondly, several dye-discharge agents were applied directly onto the substrate and exposed to 140° C., and the treated areas were compared to untreated area in the substrate, thereby demonstrating the effect of the dye-discharge agent in the substrate itself. The results are presented hereinbelow:

Original substrate redness was a*=31.1; after applying sodium bisulsite (10%) and heating to 140° C., substrate redness was a*=31.2; after applying zinc formaldehyde sulfoxylate (ZSF) substrate redness was a*=29.1; and after applying NaOCl (4%) substrate redness was a*=29.4.

As can be seen in the results, the difference in substrate redness (Δa*) was negligible and cannot be considered as a discharge effect (Δa* of 2 units is minimal).

In order to compare the effect of the DDA (ZSF) on cotton fabric—we used a 100% cotton Bellla & Canvas Red shirt and used ZSF as DDA—in this case the redness reduced from a*=41.2 to a*=22.5-Δa* of 18.7—this is a proof that DDA does work on cotton but not on polyesters fabrics.

Thirdly, in order to test the dye migration from the substrate into the white pattern, the printed substrate was exposed to curing temperatures of 110° C. and 140° C.

As shown above, a* at 80° C. was −0.1 (no redness); at 110° C. a* was 7.9, which is regarded as light pink; and at 140° C. a* was 18.9, which is regarded as pink.

For the demonstration of the herein-disclosed method, ZFS (an exemplary dye-discharge agent) was applied by inkjet printing and by dripping manually by a Pasteur pipette as well, the main difference between inkjet and dripping application for this case is the quantity that is applied—in dripping we were able to apply large quantity of the ZSF—in dripping we applied about 3 ml/inch^2 while by inkjet we deposited less than 0.1 ml/inch^2.

In order to test another dye-discharge agent NaOCl was applied only by dripping manually by a Pasteur pipette.

At 110° C. the redness of the white pattern measured a*=7.9; when the white ink was contacted with ZFS by inkjet the redness decreases to a*=2.3; when the white ink was contacted with ZFS, by dripping the redness decreases to a*=0.4; and when the white ink was contacted with NaOCl by dripping the redness decreases to a*=5.7.

At 140° C. the redness of the white pattern measured a*=18.9; when the white ink was contacted with ZSF by inkjet, the redness decreased to a*=10.4; when the white ink was contacted with ZFS by dripping, the redness decreases to a*=2.7; and when the white ink was contacted with NaOCl by dripping, the redness decreases to a*=17.9.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

In addition, any priority document(s) of this application is/are hereby incorporated herein by reference in its/their entirety.

What is claimed is:

1. A method of printing an image on a pre-dyed synthetic fabric, comprising:

(a) applying at least one ink composition on the fabric on at least one first area, so as to form the image;

(b) applying a dye-discharge agent on at least one second area of the fabric, said at least one second area is at least partially overlapping said at least one first area; and (c) curing the image, wherein:

said curing is effected by heating said at least one ink composition that forms the image;

the pre-dyed synthetic fabric releases a dye upon said heating;

and said dye is dischargeable by said dye-discharge agent when released from the fabric upon said heating;

a pigment in said at least one ink composition is impervious to said dye-discharge agent; and one of said at least one ink composition comprises an opaque white pigment, and said applying said at least one ink composition further comprises applying another of said at least one ink composition that comprises a transparent colored pigment subsequent to said ink composition that comprises said opaque white pigment.

2. The method of claim 1, wherein step (a) is effected prior to step (b).

3. The method of claim 1, wherein step (a) is effected concomitant with step (b).

4. The method of claim 1, wherein step (a) is effected subsequent to step (b).

5. The method of claim 1, wherein said applying is effected by inkjet printing, screen printing or spray.

6. A method of improving the whiteness of a white layer printed on a pre-dyed substrate, comprising applying a white ink composition on at least one an area of the substrate and applying a dye-discharge agent essentially on said area, wherein the pre-dyed substrate releases a dye upon heating the substrate, said dye is dischargeable by said dye-discharge agent when released from the substrate, and said applying said dye-discharge agent is effected prior to said heating of said ink composition.

* * * * *